(12) United States Patent
Miyamoto

(10) Patent No.: US 12,455,580 B2
(45) Date of Patent: Oct. 28, 2025

(54) ELECTROMEDICAL DEVICE CONTROL SYSTEM AND METHOD OF CONTROLLING ELECTROMEDICAL DEVICE SYSTEM

(71) Applicant: Japan Lifeline Co., Ltd., Tokyo (JP)

(72) Inventor: Hisao Miyamoto, Tokyo (JP)

(73) Assignee: JAPAN LIFELINE CO., LTD., Tokyo (JP)

( * ) Notice: Subject to any disclaimer, the term of this patent is extended or adjusted under 35 U.S.C. 154(b) by 553 days.

(21) Appl. No.: 17/941,717

(22) Filed: Sep. 9, 2022

(65) Prior Publication Data
US 2023/0229176 A1    Jul. 20, 2023

(30) Foreign Application Priority Data

Jan. 20, 2022 (JP) ................. 2022-007069

(51) Int. Cl.
*G05D 7/06* (2006.01)
*G01F 1/34* (2006.01)
*G01F 25/10* (2022.01)

(52) U.S. Cl.
CPC ............ *G05D 7/0617* (2013.01); *G01F 1/34* (2013.01); *G01F 25/10* (2022.01); *G05D 7/0623* (2013.01)

(58) Field of Classification Search
CPC ...... G05D 7/0617; G05D 7/0623; G01F 1/34; G01F 25/10
USPC ........................................................ 137/486
See application file for complete search history.

(56) References Cited

U.S. PATENT DOCUMENTS

| | | | | |
|---|---|---|---|---|
| 5,193,545 A | * | 3/1993 | Marsoner | A61B 5/14532 604/27 |
| 5,211,201 A | * | 5/1993 | Kamen | A61M 5/162 137/183 |
| 9,750,875 B2 | * | 9/2017 | Smith | A61M 5/16854 |
| 11,499,856 B2 | * | 11/2022 | Banerjee | G06F 16/252 |
| 2011/0071390 A1 | * | 3/2011 | Liu | A61B 6/504 600/431 |
| 2012/0078185 A1 | * | 3/2012 | Smith | A61M 5/14546 604/152 |
| 2012/0137250 A1 | * | 5/2012 | Milne | A61M 16/026 715/808 |

(Continued)

FOREIGN PATENT DOCUMENTS

| | | |
|---|---|---|
| JP | 5737765 B | 6/2015 |
| JP | 2018-196753 A | 12/2018 |
| JP | 2022-502196 A | 1/2022 |

*Primary Examiner* — Minh Q Le
(74) *Attorney, Agent, or Firm* — MUNCY, GEISSLER, OLDS & LOWE, P.C.

(57) ABSTRACT

Object
Provided is an electromedical device control system and the like capable of improving the accuracy of determining a blocked state of a flow path.
Solving means
An electromedical device control system according to an embodiment of the present disclosure includes a determination unit that performs predetermined determination based on a pressure value of a fluid supplied to a flow path of an electromedical device, a pressure threshold set according to a setting value of a flow rate of the fluid, and an amount of change over time in the pressure value. The determination unit determines whether the amount of change over time in the pressure value is a positive value when determining that the pressure value is equal to or greater than the pressure threshold.

12 Claims, 13 Drawing Sheets

(56) References Cited

U.S. PATENT DOCUMENTS

| | | | |
|---|---|---|---|
| 2013/0291970 A1* | 11/2013 | Schnell | A61M 1/16 |
| | | | 285/119 |
| 2015/0290382 A1* | 10/2015 | Fontanazzi | A61M 1/367 |
| | | | 700/282 |
| 2019/0070359 A1 | 3/2019 | Wolff | |
| 2021/0330349 A1* | 10/2021 | Hochman | A61B 5/7246 |
| 2021/0338931 A1 | 11/2021 | Argersinger et al. | |
| 2022/0096108 A1* | 3/2022 | Baker | A61B 17/22012 |

* cited by examiner

ELECTROMEDICAL DEVICE CONTROL SYSTEM AND METHOD OF CONTROLLING ELECTROMEDICAL DEVICE SYSTEM

TECHNICAL FIELD

The present disclosure relates to an electromedical device control system and a method of controlling an electromedical device system.

BACKGROUND ART

For example, Patent Literature 1 discloses a system (electromedical device system) including an electromedical device such as an ablation catheter, and a system (electromedical device control system) controlling the electromedical device. In Patent Literature 1, a predetermined fluid (irrigation liquid) is supplied to a flow path of the electromedical device.

CITATION LIST

Patent Literature

Patent Literature 1: Japanese Patent No. 5737765

SUMMARY OF INVENTION

Technical Problem

An electromedical device control system is required to accurately determine a blocked state of a flow path through which a fluid flows by suppressing erroneous determination or the like. It is desirable to provide an electromedical device control system and a method of controlling an electromedical device system that are capable of improving the determination accuracy of a blocked state of a flow path.

Solution to Problem

An electromedical device control system according to an embodiment of the present disclosure includes a determination unit that performs predetermined determination based on a pressure value of a fluid supplied to a flow path of an electromedical device, a pressure threshold set according to a setting value of a flow rate of the fluid, and an amount of change over time in the pressure value. The determination unit determines whether the amount of change over time in the pressure value is a positive value when determining that the pressure value is equal to or greater than the pressure threshold.

A method of controlling an electromedical device system according to an embodiment of the present disclosure includes performing predetermined determination based on a pressure value of a fluid supplied to a flow path of an electromedical device, a pressure threshold set according to a setting value of a flow rate of the fluid, and an amount of change over time in the pressure value. The performing of the predetermined determination includes determining whether the amount of change over time in the pressure value is a positive value when determining that the pressure value is equal to or greater than the pressure threshold.

DESCRIPTION OF EMBODIMENT

An embodiment of the present disclosure will be described below in detail with reference to the drawings. Note that the description will be given in the following order.

1. Embodiment (example in which a determination unit is provided in a fluid supply device)
2. Modified Examples
    Modified Example 1 (another process example related to a process of determining a blocked state of a flow path)
    Modified Example 2 (example when a process of reducing noise included in a fluid pressure value is performed)
    Modified Example 3 (example in which the determination unit is provided in a power supply device)
    Modified Example 4 (example in which the determination unit, the fluid supply unit, and the like are provided in a single control device)
3. Other Modified Examples

1. EMBODIMENT

Configuration of Catheter System 5

Figure 1:
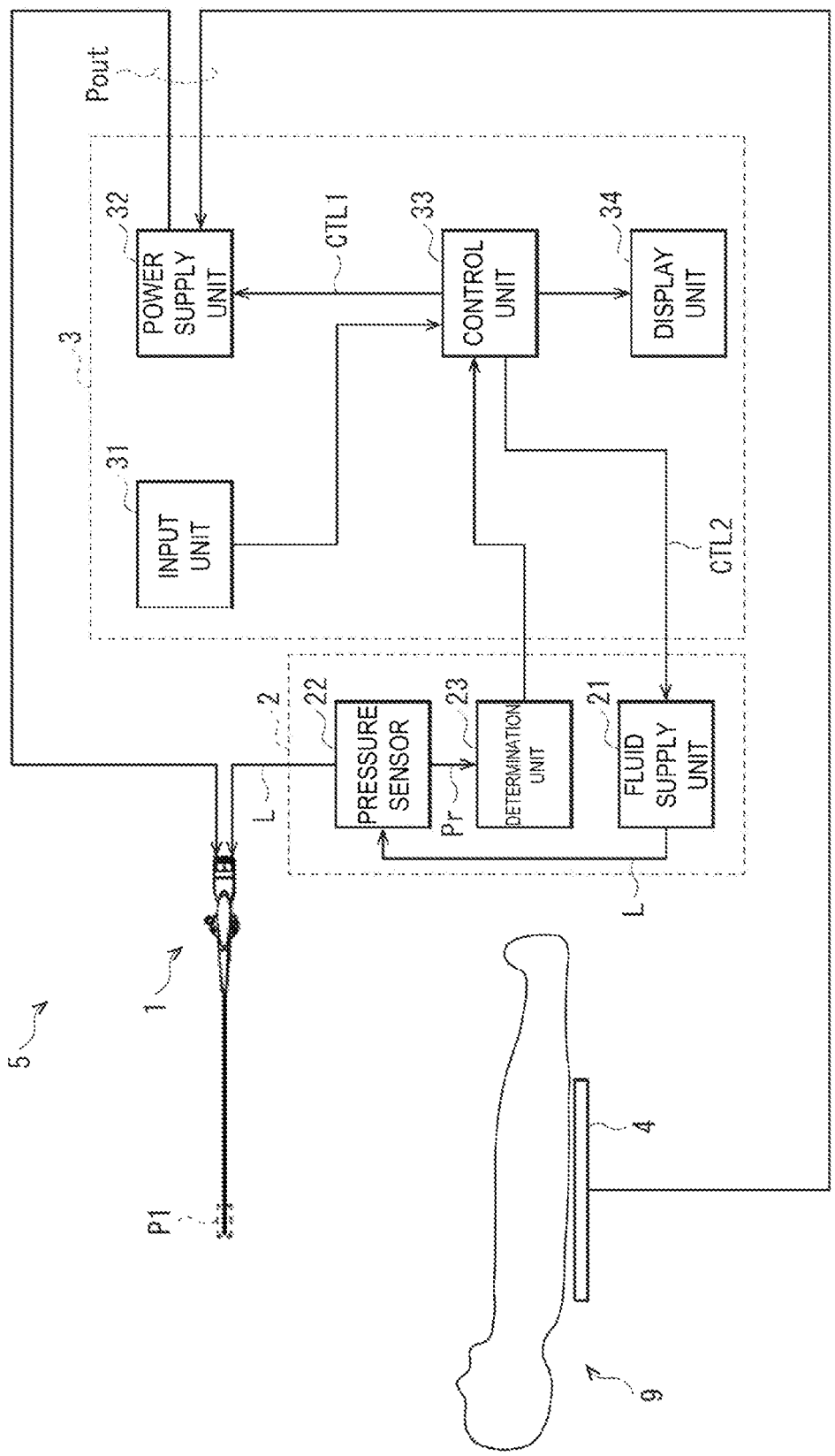
FIG. 1 is a block diagram schematically illustrating an overall configuration example of an electromedical device system including an electromedical device control system according to an embodiment of the present disclosure.

FIG. 1 is a block diagram schematically illustrating an overall configuration example of a catheter system 5 as an electromedical device system according to an embodiment of the present disclosure. The catheter system 5 is a system used when treating an affected area in the body of a patient 9, and performs predetermined ablation on the affected area. The catheter system 5 includes an ablation catheter 1, a fluid supply device 2, and a power supply device 3. That is, in the catheter system 5 of the present embodiment, the fluid supply device 2 and the power supply device 3 are configured as separate bodies. In the case of ablation using the catheter system 5, for example, a counter electrode plate 4 illustrated in FIG. 1 is also appropriately used.

A control system (catheter control system) including the fluid supply device 2 and the power supply device 3 corresponds to a specific example of an "electromedical device control system" in the present disclosure. Since a "control method of the electromedical device system" in the present disclosure is embodied in the electromedical device system of the present disclosure, the control method will be described together below.

Ablation Catheter 1

The ablation catheter 1 is an electrode catheter that is inserted into the body of the patient 9 through a blood vessel and ablates the affected area to treat arrhythmia or the like. The ablation catheter 1 has an irrigation mechanism in which a predetermined fluid (for example, an irrigation fluid (liquid) such as physiological saline) is discharged (injected) from a distal end P1 at the time of ablation. In other words, the catheter system 5 is a catheter system with an irrigation mechanism for performing irrigation using a predetermined fluid.

The ablation catheter 1 corresponds to a specific example of an "electromedical device" in the present disclosure.

Figure 2:
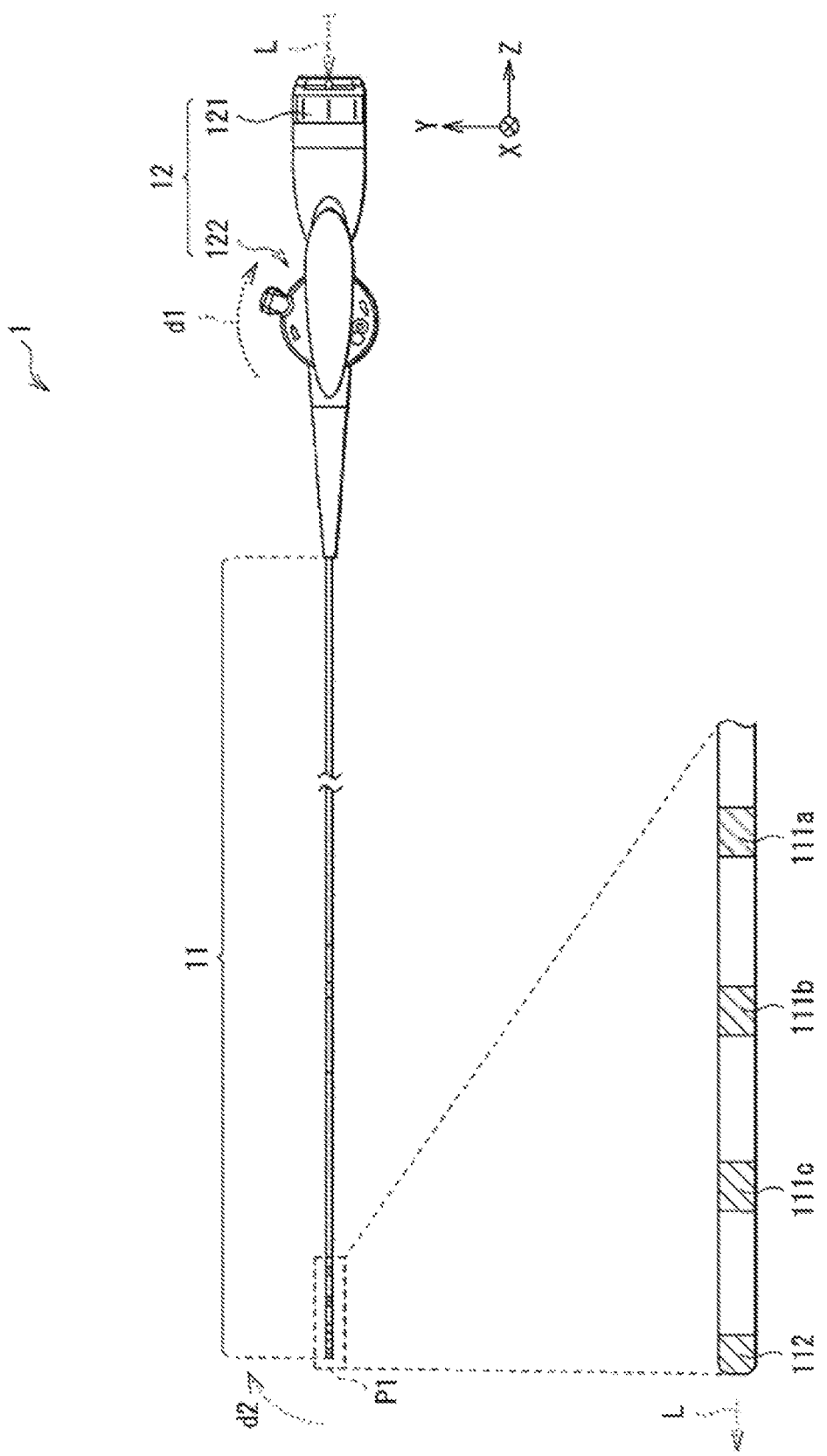
FIG. 2 is a schematic diagram illustrating a schematic configuration example of an ablation catheter illustrated in FIG. 1.

FIG. 2 schematically illustrates a schematic configuration example of the ablation catheter 1. The ablation catheter 1 includes a shaft 11 (catheter shaft) as a catheter body and an operating unit 12 attached to the base end of the shaft 11.

The shaft 11 has a flexible tubular structure (tubular member) and extends along its axial direction (Z-axis direction). The shaft 11 is made of, for example, a synthetic resin such as polyolefin, polyamide, polyether polyamide, or polyurethane. The shaft 11 has a so-called single-lumen structure in which one lumen (pore, through-hole) is formed. Alternatively, the shaft 11 has a so-called multi-lumen structure in which a plurality of (for example, four) lumens are formed. Inside of the shaft 11, both a region having a single-lumen structure and a region having a multi-lumen structure may be provided. Various thin wires (lead wires, operating wires, and the like) (not illustrated) are inserted into the lumen in a mutually electrically insulated state.

Inside the shaft 11, in addition to the lumen for inserting various fine wires, a lumen (flow path) for flowing an irrigation fluid L is formed along the axial direction. A mechanism (temperature measuring mechanism) for measuring the temperature near the distal end P1 (around the affected area) may be provided near the distal end P1 of the shaft 11. In that case, information indicating the measured temperature near the distal end P1 (measured temperature information) is supplied from the ablation catheter 1 to the power supply device 3.

As illustrated in the enlarged view of the distal end P1 and the vicinity thereof in FIG. 2, a plurality of electrodes (in this example, three ring-shaped electrodes 111a, 111b, and 111c and one distal end electrode 112) are provided at and near the distal end P1 of the shaft 11. Ablation is performed between such these electrodes and the counter electrode plate 4 described later.

Specifically, the ring-shaped electrodes 111a, 111b, and 111c and the distal end electrode 112 are arranged at and near the distal end P1 at predetermined intervals in this order toward the distal end of the shaft 11. The ring-shaped electrodes 111a, 111b, and 111c are fixedly arranged on the outer peripheral surface of the shaft 11. In contrast, the distal end electrode 112 is fixedly arranged at the most distal end of the shaft 11. These electrodes are electrically connected to the operating unit 12 via a plurality of lead wires inserted in the lumen of the shaft 11.

As indicated by the arrow in FIG. 2, the irrigation fluid L flows out from the vicinity of the distal end of the distal end electrode 112. A resin tube (flow path) for flowing the fluid L passes through the inside of the ablation catheter 1, and a port connected to the outside from the operating unit 12 is formed. The ablation catheter 1 is connected to the fluid supply device 2 described later via another connection tube connected to the port, and the fluid L sent out from the fluid supply device 2 can be irrigated from the distal end PT.

The ring-shaped electrodes 111a, 1111b, and 111c and the distal end electrode 112 are made of metal materials having good electrical conductivity, such as aluminum (Al), copper (Cu), stainless steel (SUS), gold (Au), or platinum (Pt). In order to improve the contrast with respect to X-rays when the ablation catheter 1 is used, the electrodes are preferably made of platinum or an alloy thereof.

The operating unit 12 is attached to the base end of the shaft 11 and includes a handle 121 (grip portion) and a rotating plate 122.

The handle 121 is a portion that the operator (physician) grabs (grasps) when using the ablation catheter 1. The rotating plate 122 is a member that is operated when the vicinity of the distal end of the shaft 11 is curved. For example, as indicated by the arrow in FIG. 2, the operation of rotating the rotating plate 122 along the rotation direction d1 is possible.

Fluid Supply Device 2

The fluid supply device 2 is a device that supplies the irrigation fluid L to the ablation catheter 1. As illustrated in FIG. 1, the fluid supply device 2 includes a fluid supply unit 21, a pressure sensor 22, and a determination unit 23. That is, the fluid supply unit 21 and the determination unit 23 are provided in the fluid supply device 2, and the fluid supply device 2 corresponds to a specific example of a "single device" in the present disclosure.

The fluid supply unit 21 supplies the fluid L to the flow path in the ablation catheter 1 at any time, the flow rate of the fluid L being defined by a control signal CTL2 described later. The fluid supply unit 21 includes, for example, a fluid pump and a resin tube.

The pressure sensor 22 is a sensor that measures the pressure value Pr of the fluid L flowing through the flow path. The pressure value Pr of the fluid L measured by the pressure sensor 22 is supplied to the determination unit 23 as illustrated in FIG. 1. The pressure sensor 22 may be separately provided outside the fluid supply device 2, for example, and the same applies to modified examples described later.

The determination unit 23 makes predetermined determination based on the pressure value Pr of the fluid L measured by the pressure sensor 22, a pressure threshold Prth with respect to the pressure value Pr, and an amount of change over time (pressure gradient $\Delta Pr$ described later) in the pressure value Pr. Specifically, the determination unit 23 performs a process of determining the blocked state of the flow path through which the fluid L flows (process of determining whether at least a part of the flow path is in a blocked state). As illustrated in FIG. 1, the determination result and the like from the determination unit 23 are supplied to a control unit 33 described later in the power supply device 3. The details of the determination process and the like by the determination unit 23 will be described later (see FIGS. 8 and 9 and the like).

Power Supply Device 3

The power supply device 3 is a device that supplies electric power Pout (for example, radio frequency (RF) power) for ablation between the above-mentioned electrodes of the ablation catheter 1 and the counter electrode plate 4. That is, the power supply device 3 supplies the power Pout to the ablation catheter 1. The power supply device 3 controls an operation of supplying the fluid L in the fluid supply device 2. As illustrated in FIG. 1, the power supply device 3 includes an input unit 31, a power supply unit 32, a control unit 33, and a display unit 34.

The input unit 31 is a unit for inputting various setting values and instruction signals (operation signals) for instructing a predetermined operation. Examples of the various setting values include the set power of the power Pout, the flow rate of the fluid L during various flow rate operations described later, and various thresholds (pressure threshold Prth, time threshold Δtth) described later. The operation signal is input from the input unit 31 in response to an operation by an operator (for example, a technician or the like) of the power supply device 3. However, various setting values may not be input according to the operation by the operator, but may be set in advance in the power supply device 3 at the time of shipment of the product, for example. The setting value input by the input unit 31 is supplied to the control unit 33. The input unit 31 includes, for example, a predetermined dial, buttons, and a touch panel.

The power supply unit 32 is a unit that outputs the power Pout according to a control signal CTL1 supplied from the control unit 33. The power supply unit 32 includes a predetermined power supply circuit (for example, a switching regulator). For example, when the power Pout is radio frequency power, the frequency of the power Pout is about 450 kHz to 550 kHz (preferably 500 kHz).

The control unit 33 is a unit that controls the entire power supply device 3 and performs predetermined arithmetic processing, and includes, for example, a microcomputer. As illustrated in FIG. 1, for example, the control unit 33 controls an operation of supplying the power Pout in the power supply unit 32 using the control signal CTL1. The control unit 33 also controls an operation of supplying the fluid L in the fluid supply unit 21 using the control signal CTL2. Specifically, the control unit 33 controls the flow rate of the fluid L (fluid flow rate F) using, for example, the control signal CTL2.

Figure 3:
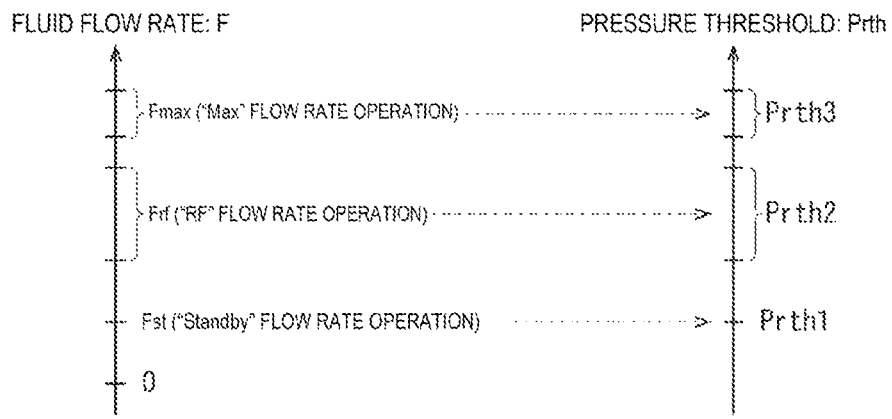
FIG. 3 is a schematic diagram illustrating an example of a correspondence relationship between a flow rate operation and a pressure threshold of a fluid.

FIG. 3 schematically illustrates an example of the fluid flow rate F (flow rate operation of the fluid L) including an example of a correspondence relationship with the pressure threshold Prth described later.

The control unit 33 sets the value of the fluid flow rate F (the type of the flow rate operation in the fluid supply unit 21) defined by the control signal CTL2. In the example illustrated in FIG. 3, the values of the fluid flow rate F (the types of the flow rate operation) include the following values.

Large flow rate operation in which the fluid flow rate F is the flow rate Fmax near the maximum flow rate within the set range ("Max" flow rate operation where F=Fmax ("Flush" flow rate operation))

Small flow rate operation during the execution period of the operation of supplying the power Pout (ablation operation) where the fluid flow rate F is a relatively small flow rate Frf ("RF" flow rate operation where F=Frf (<Fmax))

Standby flow rate operation where the fluid flow rate F is a very small flow rate (flow rate Fst) ("Standby" flow rate operation where F=Fst (0<Fst≤Frf))

Specific examples of the values of the flow rates Fmax, Frf, and Fst include the following values.

Fmax=40 to 50 (mL/min)

Frf=2 to 30 (mL/min) (Frf changes according to the setting value (wattage) of the power Pout)

Fst=2 (mL/min)

In the present embodiment, the value of the fluid flow rate F (the type of the flow rate operation) can be freely changed. Further, for example, as illustrated in FIG. 3, the pressure threshold Prth (threshold related to the pressure value Pr used in the process of determining the blocked state of the flow path, which will be described later) is set according to the setting value of the fluid flow rate F. Specifically, the pressure threshold Prth is basically set so as to tend to increase or decrease as the setting value of the fluid flow rate F increases or decreases. Specifically, when the setting value of the fluid flow rate F increases, the pressure threshold Prth is set such that the increase amount of the pressure threshold Prth becomes 0 (zero) or greater. When the setting value of the fluid flow rate F decreases, the pressure threshold Prth is set such that the decrease amount of the pressure threshold Prth becomes 0 or greater. For example, at least one of the increase amount or the decrease amount of the pressure threshold Prth does not need to include zero (the pressure threshold Prth may be set such that at least one of the increase amount or the decrease amount of the pressure threshold Prth exceeds zero).

Specifically, in the example illustrated in FIG. 3, the pressure threshold Prth is set as follows corresponding to each flow rate operation described above. For example, for Prth2, a different value may be set for each flow rate of Frf=2 to 30 (mL/min). That is, the setting value of Prth2 may be different between the case of Frf=2 (mL/min) and the case of Frf=30 (mL/min). In this regard, the same applies to, for example, Prth3.

Pressure threshold Prth during "Max" flow rate operation ("Flush" flow rate operation)=Prth3

Pressure threshold Prth during "RF" flow rate operation=Prth2 (<Prth3)

Pressure threshold Prth during "Standby" flow rate operation=Prth1 (≤Prth2)

The details of the correspondence relationship between the fluid flow rate F (flow rate operation of the fluid L) and the pressure threshold Prth will be described later (see FIGS. 4 to 9).

The display unit 34 is a unit (monitor) that displays various pieces of information and outputs these pieces of information to the outside. The display unit 34 is configured using a display according to various modes (for example, a liquid crystal display, a cathode ray tube (CRT) display, or an organic electro luminescence (EL)).

Counter Electrode Plate 4

As illustrated in FIG. 1, for example, the counter electrode plate 4 is used in a state of being attached to the body surface of the patient 9 at the time of ablation. At the time of ablation, high frequency energization is performed (the power Pout is supplied) between the electrodes of the ablation catheter 1 and the counter electrode plate 4.

Operation and Advantages and Effects

A. Basic Operation

In the catheter system 5, the distal end P1 of the shaft 11 of the ablation catheter 1 is inserted into the body of the patient 9 through a blood vessel during the treatment of arrhythmia or the like. At this time, the shape near the distal end P1 of the shaft 11 inserted into the body changes, for example, in one direction or both directions according to the operation of the operating unit 12 by the operator. Specifically, when the rotating plate 122 is rotated by the operator's finger, for example, along the rotation direction d1 indicated by the arrow in FIG. 2, an operating wire (not illustrated) is pulled toward the base end in the shaft 11. As a result, the vicinity of the distal end P1 of the shaft 11 is curved along the direction d2 indicated by the arrow in FIG. 2.

Then, the power Pout (for example, radio frequency power) is supplied from the power supply device 3 between the electrodes at and near the distal end P1 of the shaft 11 and the counter electrode plate 4, so that ablation by the Joule heat generation is performed on the affected area in the body of the patient 9. The radio frequency energization selectively ablates a treatment target site (procedure part) of the patient 9, and transvascular treatment of arrhythmia or the like is performed.

At the time of ablation, the irrigation fluid L is supplied from the fluid supply device 2 to the ablation catheter 1. The control unit 33 in the power supply device 3 controls the operation of supplying the fluid L in the fluid supply device 2 using the control signal CTL2. As a result, the irrigation fluid L is discharged from the vicinity of the distal end of the distal end electrode 112 of the ablation catheter 1 (see the arrow in FIG. 2). As a result, it is avoided that excessive increase in the temperature of the procedure part during ablation causes damage and that a thrombus sticks to the procedure part (blood retention is improved).

However, if the flow rate of the fluid L discharged to the procedure part is too large, the temperature of the procedure part decreases, which may hinder the treatment during procedure (for example, ablation is not sufficient and the ablated area becomes small). Further, if the fluid L enters the body too much, the burden on the patient 9 may increase. On the other hand, if the flow rate of the fluid L is too small, the effects of cooling the procedure part and improving blood retention may be insufficient. In particular, when the power Pout at the time of ablation is high, tissue damage and thrombus due to excessive ablation are likely to occur, so that the above-mentioned tendency becomes high.

From these facts, in the catheter system 5 with an irrigation mechanism, it is required to adjust the flow rate of the fluid L (fluid flow rate F) according to the usage situation to achieve an appropriate irrigation operation.

B. Blocked State of Flow Path

Further, in the ablation catheter 1 having an irrigation mechanism, an irrigation opening may be blocked by a thrombus or the like during ablation. Further, foreign matter may enter the flow path of the irrigation fluid L and block the flow path. When at least a part of the flow path through which the irrigation fluid L flows is in a blocked state (completely blocked state or partially blocked state) in this way, the result is as follows. That is, for example, the effects of cooling the procedure part and improving blood retention may be insufficient, or the ablation catheter 1 may be damaged.

Thus, in the present embodiment, as will be described later, the pressure value Pr of the fluid L is compared with the pressure threshold Prth, and thus, for example, the blocked state of the flow path is determined. However, in the present embodiment, the setting value of the pressure threshold Prth is also changed according to the change of the setting value of the flow rate of the fluid L (fluid flow rate F) (see FIG. 3). Therefore, for example, in the case of a change to decrease the setting value of the fluid flow rate F, if the determination is made only by comparing the pressure value Pr and the pressure threshold Prth, there is a risk of erroneous determination when determining the blocked state of the flow path as described below.

Figure 4:
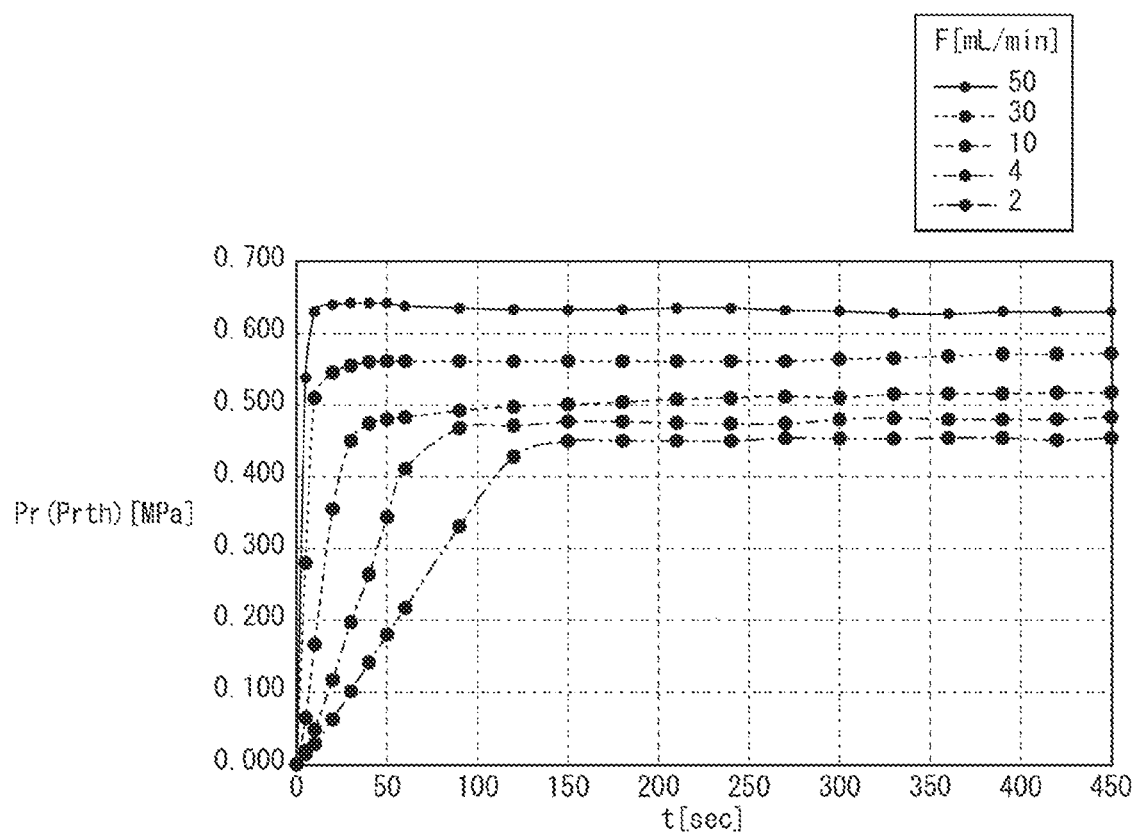
FIG. 4 is a diagram illustrating an example of a change over time in a pressure value of the fluid when a flow path is blocked.
Figure 5:
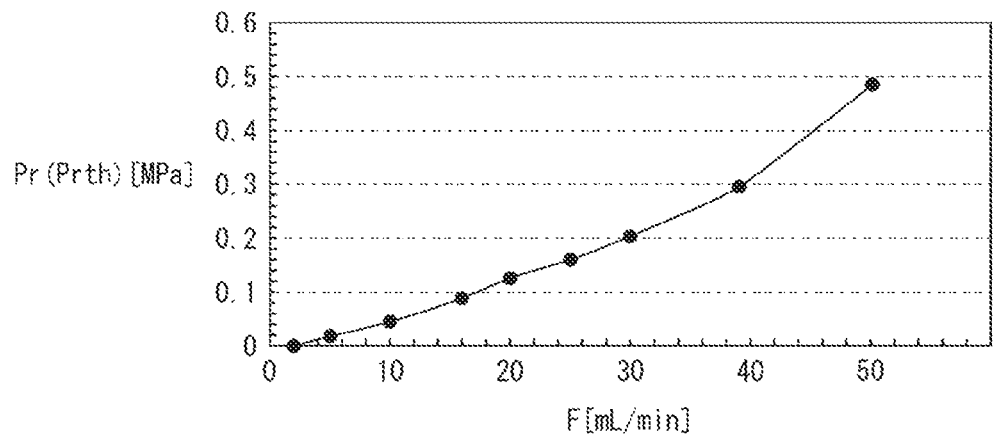
FIG. 5 is a diagram illustrating an example of a correspondence relationship between the fluid flow rate and the fluid pressure value in a stationary state.
Figure 6:
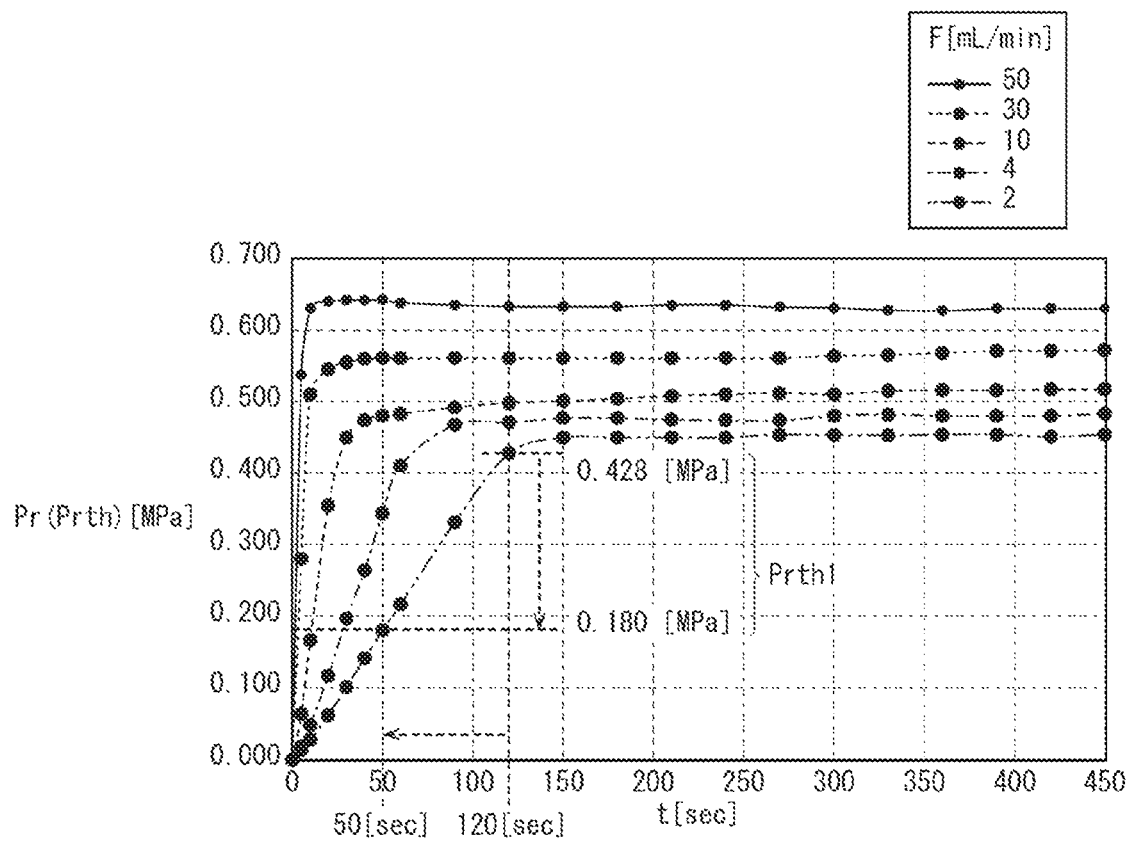
FIG. 6 is a diagram illustrating an example of a correspondence relationship between a change over time in the pressure value illustrated in FIG. 4 and the magnitude of the pressure threshold.
Figure 7:
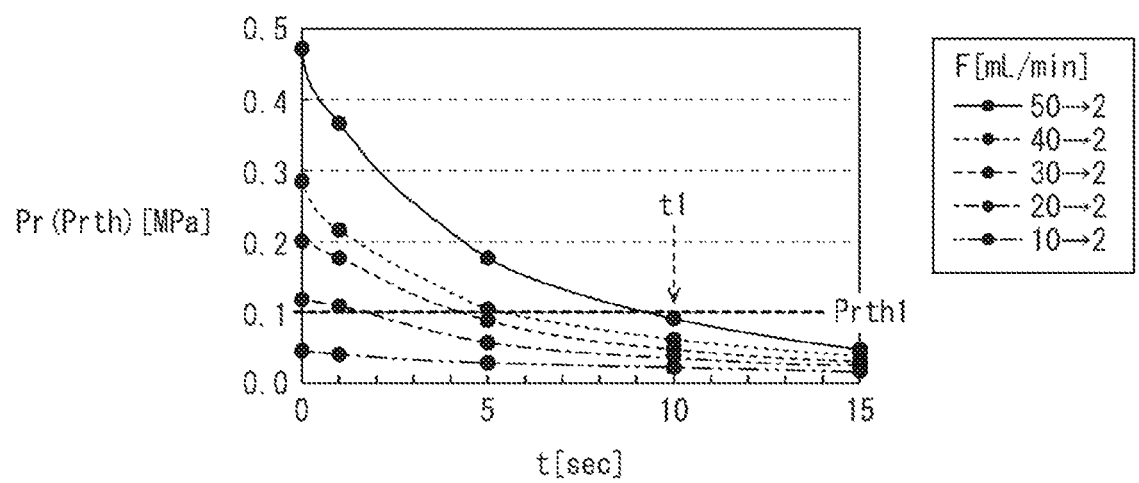
FIG. 7 is a diagram illustrating an example of a change over time in the fluid pressure value when a setting value of the fluid flow rate is changed.

FIG. 4 shows an example of a change over time in the pressure value Pr of the fluid L when the flow path is blocked (when the flow path is completely blocked). FIG. 5 shows an example of the correspondence relationship between the fluid flow rate F and the pressure value Pr of the fluid L in a stationary state. FIG. 6 shows an example of the correspondence relationship between the change over time in the pressure value Pr illustrated in FIG. 4 and the magnitude of the pressure threshold Prth. FIG. 7 shows an example of a change over time in the pressure value Pr of the fluid L when the setting value of the fluid flow rate F is changed (in the case of a change to decrease the setting value of the fluid flow rate F). In FIGS. 4 to 7, the horizontal axis indicates the time t, and specific examples of the pressure threshold Prth, and the arrival times of the pressure value Pr up to the pressure threshold Prth (corresponding to the blocked state detection time) are indicated by broken lines as appropriate.

First, for example, as illustrated in FIG. 4, it can be seen that the detection time when the flow path is completely blocked is shorter as the fluid flow rate F increases. Further, for example, as illustrated in FIG. 5, it can be seen that the pressure value Pr in the stationary state also increases as the fluid flow rate F increases.

Here, in order to shorten the blocked state detection time, it is conceivable to lower the pressure threshold Prth as much as possible for each setting value of the fluid flow rate F. Specifically, in the example illustrated in FIG. 6, when F=2 [mL/min], and the setting value of the pressure threshold Prth1 is lowered from 0.428 [MPa] to 0.180 [MPa], the blocked state detection time is shortened from 120 [sec] to 50 [sec].

However, in the case of a change to decrease the fluid flow rate F as described above, the flow path in the ablation catheter 1 typically has a structure in which the pressure tends to remain. Thus, it takes time for the pressure value Pr to converge to the stationary state when the fluid flow rate F is changed. Specifically, in the example illustrated in FIG. 7, when the setting value of the fluid flow rate F is decreased from each setting value of F=10 to 50 [mL/min] to F=2 [mL/min], the result is as follows. In this case, when the pressure threshold for F=2 [mL/min] is set to Prth1=0.1 [MPa], the blocked state detection time requires a maximum of about 10 [sec] due to the residual pressure at the time of the change to decrease the fluid flow rate F as described above (see timing t1 in FIG. 7). In other words, at the time of the change to decrease the fluid flow rate F, the period in which the pressure value Pr exceeds the pressure threshold Prth continues for a maximum of about 10 [sec].

In this way, in the case of the change to decrease the fluid flow rate F, the period in which the pressure value Pr exceeds the pressure threshold Prth continues even though the flow path is not actually blocked. Thus, there is a risk of erroneous determination (erroneous detection) that the flow path is blocked. Therefore, regarding the blocked state of the flow path through which the fluid L flows, it can be said that it is required to suppress erroneous determination due to a change of the setting value of the fluid flow rate F (in the case of a change to decrease the setting value of the fluid flow rate F) and make determination accurately.

C. Blocked State Determination Process

Thus, in the present embodiment, the determination unit 23 performs a process of determining the blocked state of the flow path through which the fluid L flows, for example, as follows.

Figure 8:
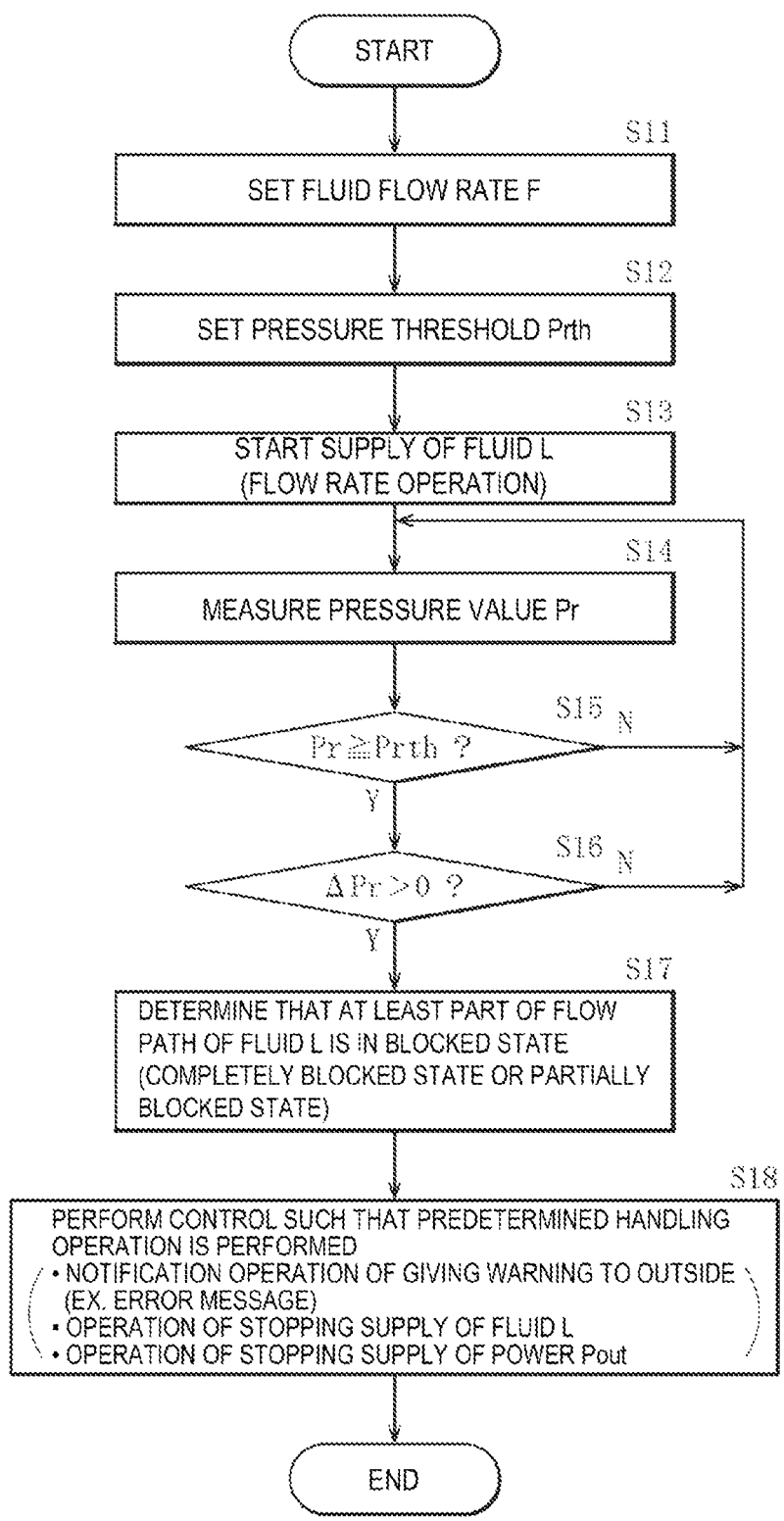
FIG. 8 is a flowchart illustrating an example of a process of determining a blocked state of the flow path according to the embodiment.
Figure 9:
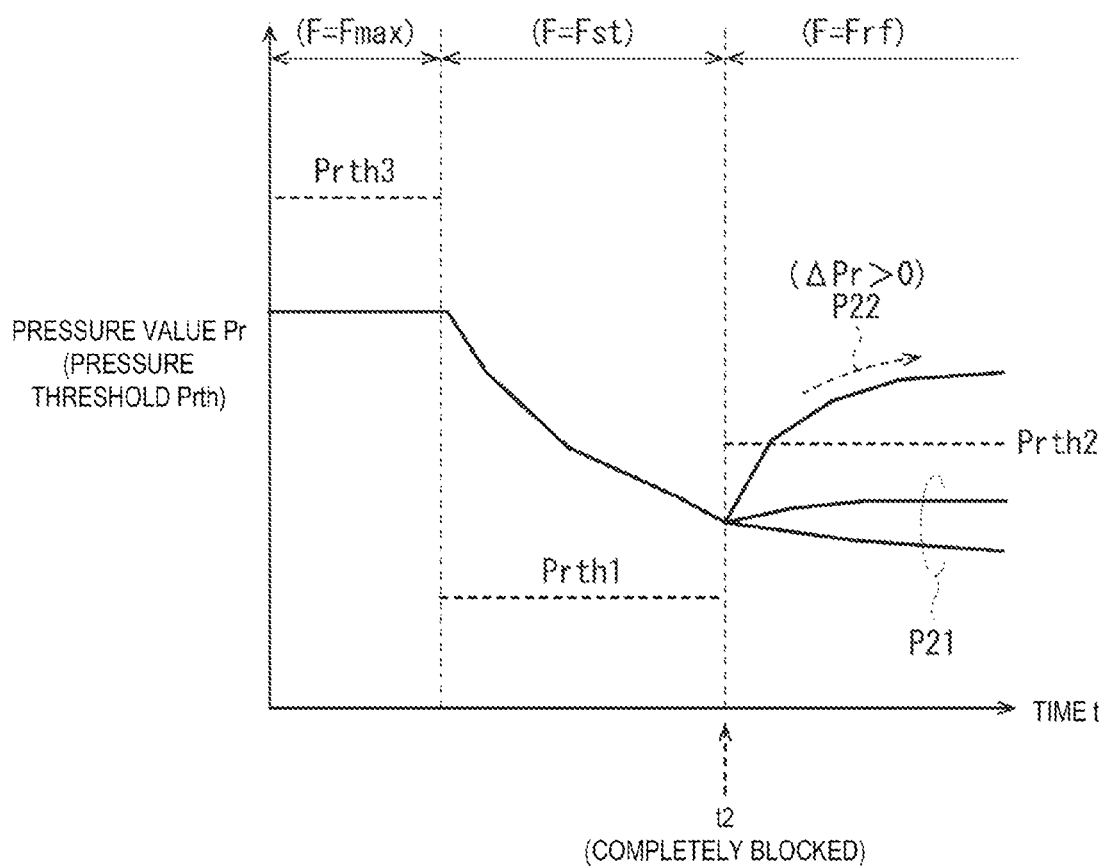
FIG. 9 is a diagram illustrating an example of a change over time in the pressure value and the pressure threshold of the fluid according to the embodiment.

FIG. 8 is a flowchart illustrating an example of the process of determining the blocked state of the flow path according to the present embodiment. FIG. 9 shows an example of the change over time in the pressure value Pr and the pressure threshold Prth of the fluid L according to the present embodiment. Specifically, FIG. 9 illustrates an example of a change over time in the pressure value Pr when transition is made from the above-mentioned "Max" flow rate operation (F=Fmax, Prth=Prth3) to the "RF" flow rate operation (F=Frf, Prth=Prth2) through the "Standby" flow rate operation (F=Fst, Prth=Prth1). That is, the transition example illustrated in FIG. 9 corresponds to the case where the setting value of the fluid flow rate F is changed to finally decrease with reference to the fluid flow rate F at the start time.

In the series of processes illustrated in FIG. 8, the fluid flow rate F at the time of ablation is first set (step S11), for example, as illustrated in FIG. 3, and also the pressure threshold Prth is set according to the setting value of the fluid flow rate F (step S12). Next, the supply of the fluid L (flow rate operation) by the fluid supply device 2 is started using the fluid flow rate F and the pressure threshold Prth (step S13).

Subsequently, the pressure sensor 22 measures the pressure value Pr of the fluid L (step S14). Then, the determination unit 23 determines whether the pressure value Pr is equal to or greater than the pressure threshold Prth set in step S12 (Pr≥Prth) (step S15). Here, when determining that the pressure value Pr is less than the pressure threshold (Pr<Prth) (step S15: N), the determination unit 23 determines that the flow path is not in a blocked state, and the process returns to step S14. Specifically, for example, as indicated by the reference sign P21 in FIG. 9, when the fluid flow rate F is finally decreased from F=Fmax to F=Frf, the pressure value Pr does not exceed the pressure threshold Prth and gradually converges if the flow path is not in a blocked state.

On the other hand, when determining that the pressure value Pr is equal to or greater than the pressure threshold Prth (Pr≥Prth) (step S15: Y), the determination unit 23 determines that the flow path may be in a blocked state and further makes the following determination. That is, the determination unit 23 determines whether the amount of change over time in the pressure value Pr (pressure gradient ΔPr) is a positive value (ΔPr>0) (step S16). Here, when determining that the pressure gradient ΔPr is not a positive value (ΔPr≤0) (step S16: N), the determination unit 23 determines that the flow path is not in a blocked state even if the pressure value Pr is equal to or greater than the pressure threshold Prth, and the process returns to step S14. That is, in this case, a predetermined handling operation (step S18) described later is not executed.

On the other hand, when determining that the pressure gradient ΔPr is a positive value (ΔPr>0) (step S16: Y), the determination unit 23 determines that at least a part of the flow path is in a blocked state (completely blocked state or partially blocked state) (step S17). Specifically, for example, as illustrated in FIG. 9, when the fluid flow rate F is finally decreased from F=Fmax to F=Frf, the result is as follows if the flow path is in a completely blocked state, for example, at the time (timing t2) of switching from F=Fst to F=Frf. In such a case, for example, as indicated by arrow P22 in FIG. 9, the pressure value Pr becomes equal to or greater than the pressure threshold Prth and the pressure gradient ΔPr becomes a positive value. Thus, it is determined that the flow path is in a completely blocked state (a completely blocked state is detected).

Next, the determination unit 23 outputs an information signal indicating the determination result that the flow path is in a blocked state to the control unit 33 in the power supply device 3 such that a predetermined handling operation is executed when it is determined that the flow path is in a blocked state (step S18). As a result, the control unit 33 performs control such that the predetermined handling operation is executed. Examples of the predetermined handling operation include at least one of the following operations.

An operation of giving a predetermined warning to the outside of the catheter system 5 (for example, an operation of displaying an error message on the display unit 34, a predetermined voice output operation, or a predetermined lighting operation)

An operation of stopping the supply of the fluid L by the fluid supply device 2 (for example, an operation of stopping the rotation of the fluid pump of the fluid supply unit 21)

An operation of stopping the supply of the power Pout to the ablation catheter 1 by the power supply device 3 (an operation of stopping the ablation)

As a result, the series of processes illustrated in FIG. 8 ends.

D. Advantages and Effects

In this way, in the present embodiment, when it is determined that the pressure value Pr of the fluid L is equal to or greater than the pressure threshold Prth, it is determined whether the amount of change over time in the pressure value Pr (pressure gradient ΔPr) is a positive value, so that it is possible to achieve the following. That is, regarding the blocked state of the flow path through which the fluid L flows, it is possible to suppress erroneous determination due to a change of the setting value of the fluid flow rate F (in the case of a change to decrease the setting value of the fluid flow rate F) as described above and make determination accurately. As a result, in the present embodiment, it is possible to improve the accuracy of determining the blocked state of the flow path.

In the present embodiment, when it is determined that the pressure value Pr is equal to or greater than the pressure threshold Prth, and when it is determined that the pressure gradient ΔPr is a positive value, the predetermined handling operation described above is executed, so that it is possible to achieve the following. That is, when it is determined that at least a part of the flow path is in a blocked state, the handling operation can be actually executed, and the convenience can be improved.

In the present embodiment, when it is determined that the pressure value Pr is equal to or greater than the pressure threshold Prth, and when it is determined that the pressure gradient ΔPr is not a positive value, the predetermined handling operation described above is not executed, so that it is possible to achieve the following. That is, when it is determined that at least a part of the flow path is not in a blocked state, the predetermined handling operation described above is not executed, so that execution of an unnecessary handling operation can be avoided, and convenience can be improved.

In the present embodiment, since the fluid supply device 2 and the power supply device 3 are configured as separate devices, these devices can be individually arranged according to the usage situation, and thus the convenience of the catheter system 5 as a whole can be improved. Specifically, for example, as illustrated in FIG. 1, since the fluid supply device 2 is arranged relatively close to the patient 9, a fluid supply tube connecting the fluid supply device 2 and the ablation catheter 1 is short, so that a physician can easily perform an operation. Further, since the power supply device 3 is arranged relatively far from the patient 9, a technician or the like can easily perform an operation. In this way, in the present embodiment, it is possible to arrange the devices according to the usage situation.

2. MODIFIED EXAMPLES

Next, modified examples (Modified Examples 1 to 4) of the above-described embodiment will be described. The same components as those in the embodiment are designated by the same reference signs, and the description thereof will be omitted as appropriate.

Modified Example 1

Figure 10:
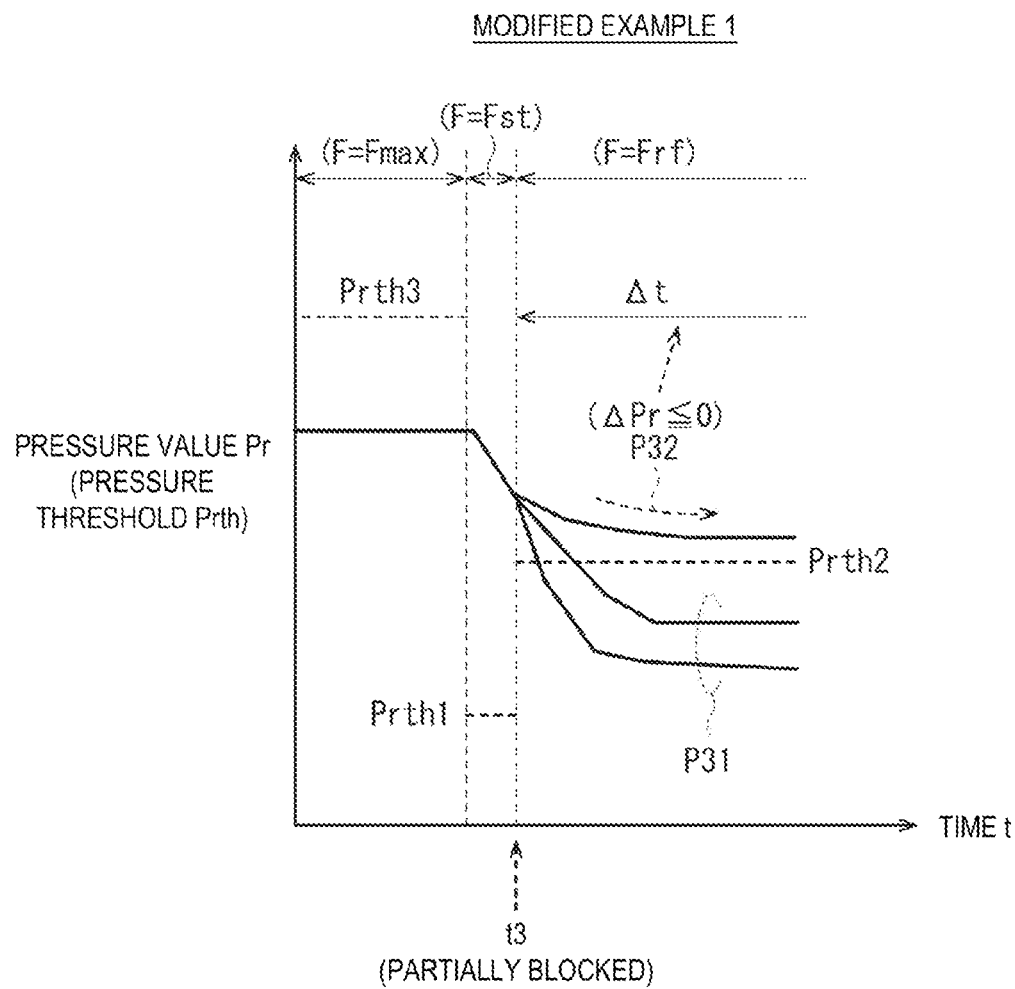
FIG. 10 is a diagram illustrating an example of a change over time in a pressure value and a pressure threshold of a fluid according to Modified Example 1.
Figure 11:
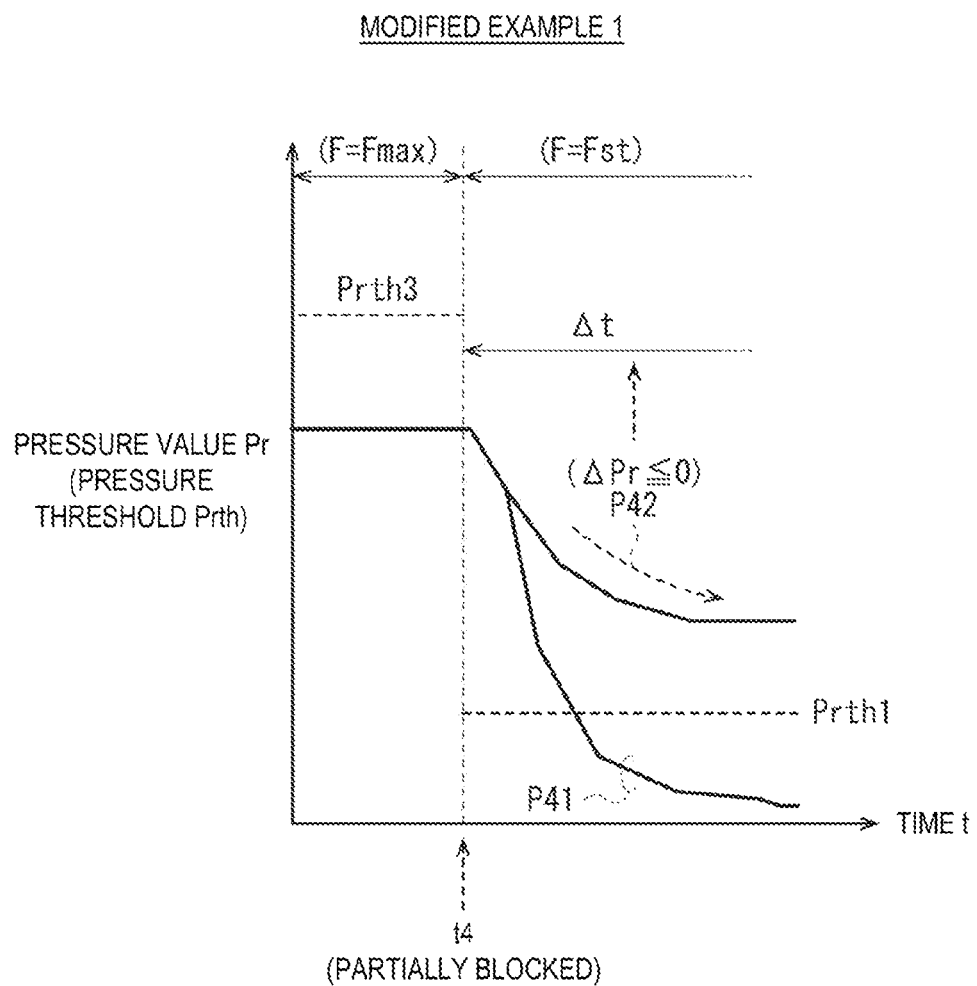
FIG. 11 is a diagram illustrating another example of a change over time in the pressure value and the pressure threshold of the fluid according to Modified Example 1.

FIGS. 10 and 11 each show an example of a change over time in the pressure value Pr and the pressure threshold Prth of the fluid L according to Modified Example 1.

Specifically, FIG. 10 illustrates an example of a change over time in the pressure value Pr when transition is made from the above-mentioned "Max" flow rate operation (F=Fmax, Prth=Prth3) to the "RF" flow rate operation (F=Frf, Prth=Prth2) through the "Standby" flow rate operation (F=Fst, Prth=Prth1). That is, the transition example illustrated in FIG. 10 corresponds to the case where the setting value of the fluid flow rate F is changed to finally decrease with reference to the setting value at the start time.

FIG. 11 illustrates an example of a change over time in the pressure value Pr when transition is directly made from the above-mentioned "Max" flow rate operation (F=Fmax, Prth=Prth3) to the "Standby" flow rate operation (F=Fst, Prth=Prth1). That is, the transition example illustrated in FIG. 11 also corresponds to the case where the setting value of the fluid flow rate F is changed to finally decrease with reference to the setting value at the start time.

In the examples of FIGS. 10 and 11, if the flow path is not in a blocked state when the fluid flow rate F is finally decreased as in the case of FIG. 9 (reference sign P21) in the embodiment, the result is as follows. That is, for example, as indicated by reference signs P31 and P41 in FIGS. 10 and 11, the pressure value Pr gradually converges without exceeding the pressure threshold Prth.

On the other hand, for example, assuming that the flow path is in a partially blocked state (not in a completely blocked state) at timings t3 and t4 illustrated in FIGS. 10 and 11, the following may occur. That is, for example, as indicated by arrows P32 and P42 in FIGS. 10 and 11, even if Pr≥Ptth, the pressure gradient ΔPr does not become a positive value (ΔPr≤0), and a partially blocked state may not be detected. That is, it can be said that when the flow path is in a partially blocked state, erroneous determination (missing of detection) of the blocked state may be made. (Blocked State Determination Process)

Thus, in Modified Example 1, in order to avoid the above-mentioned erroneous determination (missing of detection) of the blocked state of the flow path, the following determination process is performed unlike the determination process (FIG. 8) of the embodiment.

Figure 12:
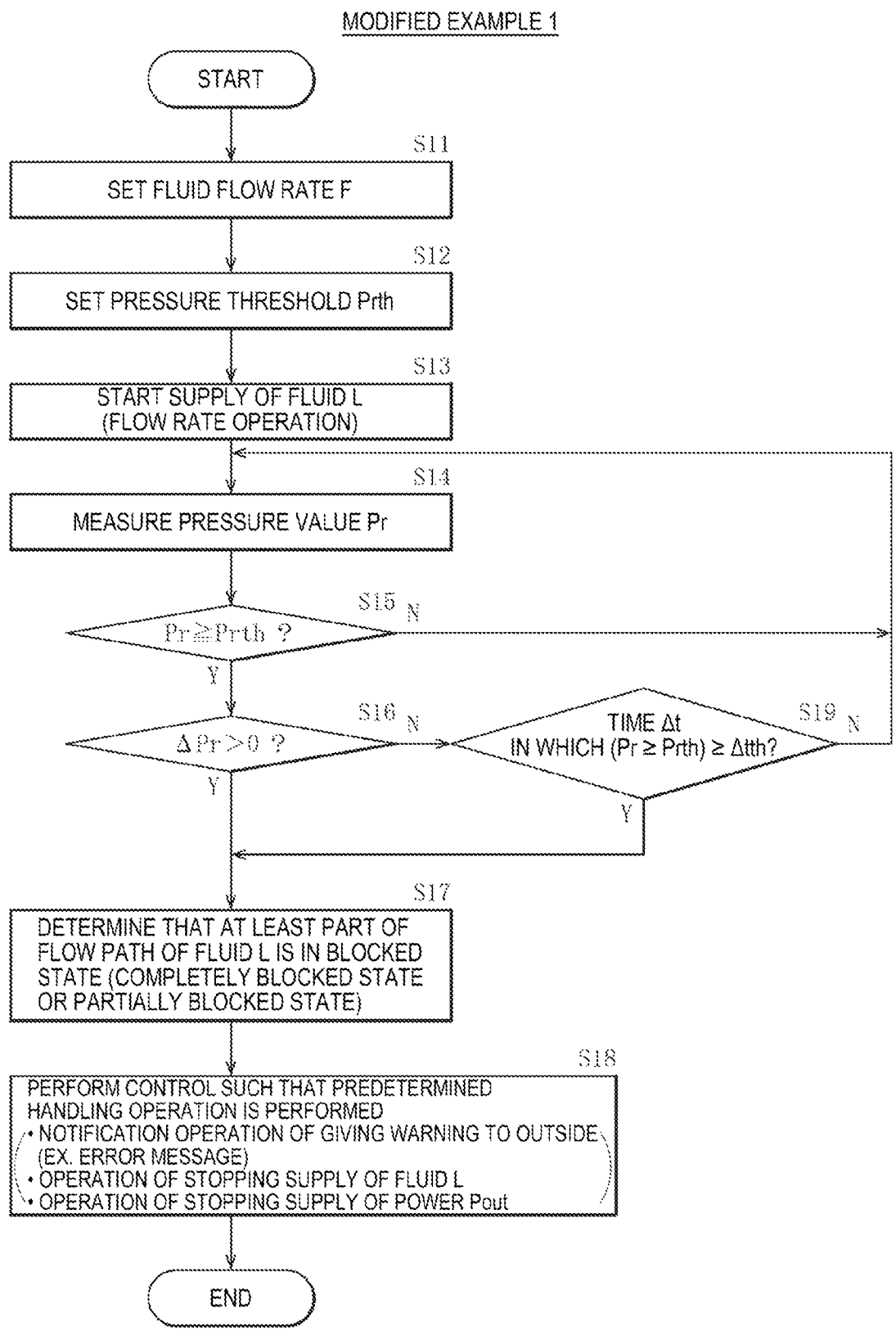
FIG. 12 is a flowchart illustrating an example of a process of determining a blocked state of a flow path according to Modified Example 1.

FIG. 12 is a flowchart illustrating an example of the process of determining the blocked state of the flow path according to Modified Example 1. The determination process example of Modified Example 1 illustrated in FIG. 12 corresponds to an example in which a process of step S19 described below is added to the determination process example of the embodiment illustrated in FIG. 8, and the other processes are basically the same. Thus, basically, the process of step S19 will be described below.

In the series of processes illustrated in FIG. 12, when it is determined in step S16 described above that the pressure gradient ΔPr is not a positive value (ΔPr≤0) (step S16: N), the following process is performed unlike the case of the series of processes illustrated in FIG. 8.

That is, subsequently, the determination unit 23 further determines whether the time Δt (see, for example, FIGS. 10 and 11) in which the pressure value Pr is equal to or greater than the pressure threshold Prth is equal to or greater than a predetermined time threshold Δtth (Δt≥Δtth) (step S19). As an example, the value of the time threshold Δtth is about 20 to 60 [sec].

Here, when it is determined that the time Δt is less than the time threshold Δtth (Δt<Δtth) (step S19: N), the following process is performed. In this case, the determination unit 23 determines that the flow path is not in a blocked state (completely blocked state or partially blocked state) even if Pr≥Prth, and the process returns to step S14. That is, in this case, the predetermined handling operation (step S18) described above is not executed.

On the other hand, when it is determined that such a time Δt is equal to or greater than the time threshold Δtth (Δt≥Δtth) (step S19: Y), the following process is performed. That is, in this case, the determination unit 23 determines that at least a part of the flow path is in a blocked state (completely blocked state or partially blocked state) (step S17). Specifically, for example, as illustrated in FIGS. 10 and 11 described above, when the fluid flow rate F is finally decreased, the flow path is in a partially blocked state at timing t3 or timing t4 described above, the following process is performed. That is, as indicated by arrows P32 and P42 in FIGS. 10 and 11, even if Pr≥Ptth and ΔPr≤0, since the time Δt where Pr≥Prth is equal to or greater than the time threshold Δtth, it is determined that the flow path is in a partially blocked state (a partially blocked state is detected).

Then, the determination unit 23 outputs an information signal indicating the determination result that the flow path is in a blocked state to the control unit 33 in the power supply device 3 such that the predetermined handling operation described above is executed (step S18).

In this way, the series of processes illustrated in FIG. 12 ends.

Advantages and Effects

In Modified Example 1, when it is determined that the pressure value Pr is equal to or greater than the pressure threshold Prth and that the amount of change over time (pressure gradient ΔPr) in the pressure value Pr is not a positive value, it is determined whether the time Δt in which the pressure value Pr is equal to or greater than the pressure threshold Prth is equal to or greater than the time threshold Δtth, so that it is possible to achieve the following. That is, even when the flow path is in a partially blocked state, it is possible to avoid erroneous determination (missing of detection) of the blocked state. As a result, in Modified Example 1, the accuracy of determining the blocked state of the flow path can be further improved as compared with the embodiment.

Modified Example 2

Figure 13:
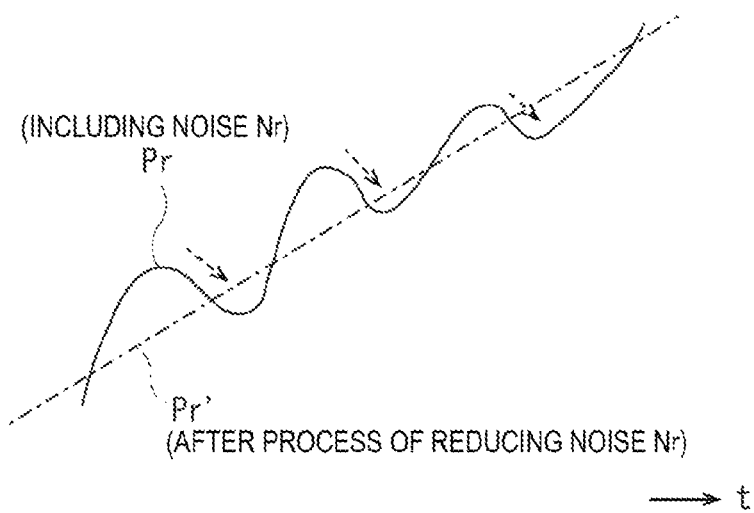
FIG. 13 is a schematic diagram for describing a noise reduction process according to Modified Example 2.

FIG. 13 is a schematic diagram for describing a process of reducing noise Nr according to Modified Example 2. In FIG. 13, the horizontal axis indicates the time t, and the vertical axis indicates the pressure value Pr of the fluid L.

In Modified Example 2, for example, as illustrated in FIG. 13, the determination unit 23 performs a predetermined reduction process (filter process, and the like) on the noise Nr included in the pressure value Pr of the fluid L, and then performs various determination processes described above (such as the process of determining the blocked state of the flow path). That is, the determination unit 23 performs various determination processes using the pressure value Pr' obtained by performing the predetermined reduction process on the pressure value Pr including the noise Nr.

The noise Nr is noise included in the pressure value Pr of the fluid L due to pulsation generated when the fluid supply unit 21 performs the operation of supplying the fluid L (for example, pulsation accompanying the pump operation by the fluid pump). Specific examples of the noise Nr subject to the predetermined reduction process described above include noise Nr having a frequency of about 0.5 to 30 [Hz].

In Modified Example 2, various determination processes are performed after the predetermined reduction process is executed on the noise Nr included in the pressure value Pr, so that the result is as follows. That is, as a result of suppressing erroneous determination and the like due to the noise Nr, it is possible to further improve the determination accuracy of the blocked state of the flow path.

Modified Example 3

Figure 14:
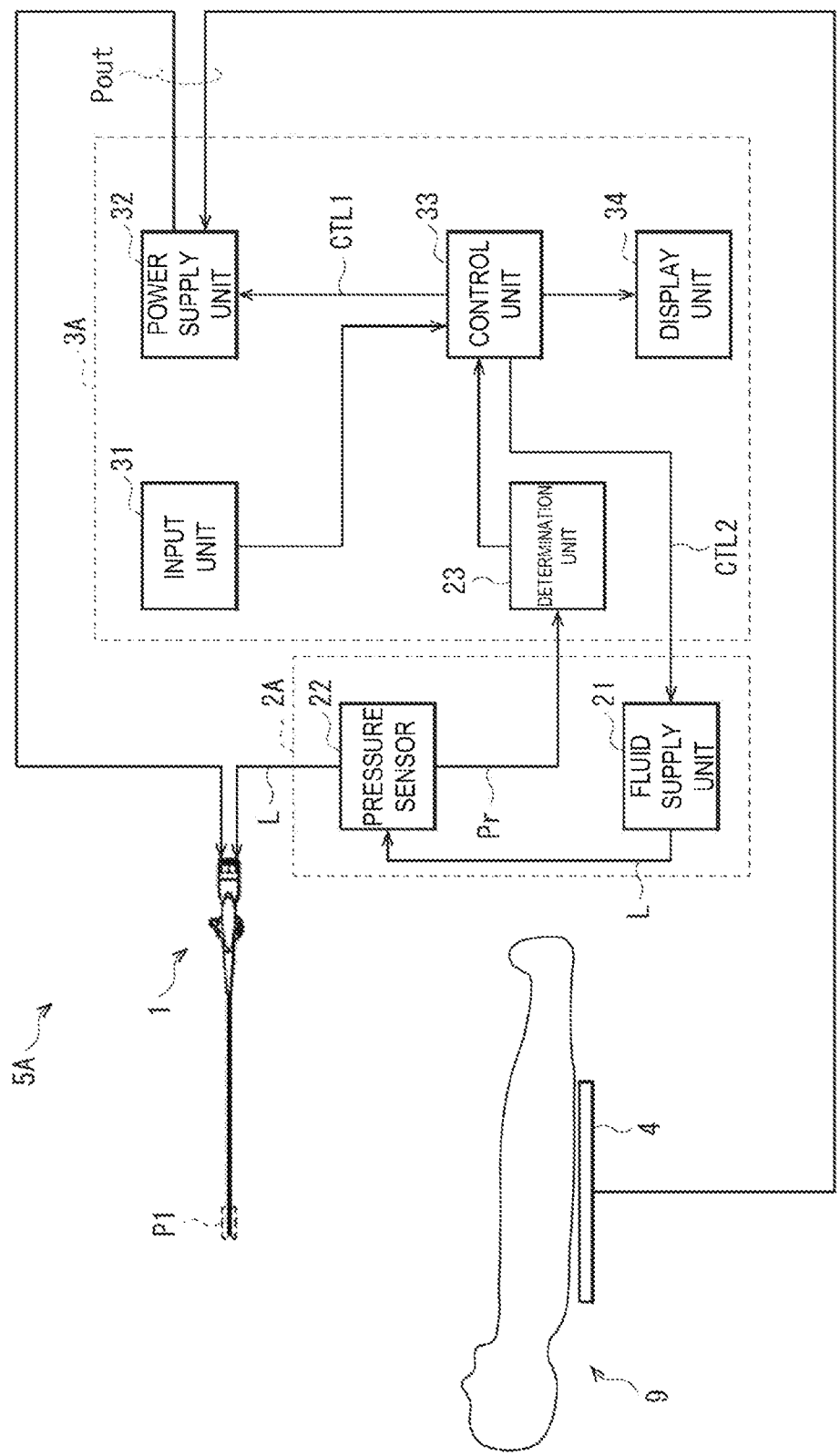
FIG. 14 is a block diagram schematically illustrating an overall configuration example of an electromedical device system including an electromedical device control system according to Modified Example 3.

FIG. 14 is a block diagram schematically illustrating an overall configuration example of a catheter system 5A as an electromedical device system according to Modified Example 3. As to the catheter system 5A, a fluid supply device 2A is provided instead of the fluid supply device 2 and a power supply device 3A is provided instead of the power supply device 3 in the catheter system 5 (FIG. 1) of the embodiment. The other configurations are the same.

The control system (catheter control system) including the fluid supply device 2A and the power supply device 3A corresponds to a specific example of the "electromedical device control system" in the present disclosure.

As to the fluid supply device 2A, the determination unit 23 is not provided (omitted) in the fluid supply device 2 (FIG. 1) as illustrated in FIG. 14. The other configurations are the same. As to the power supply device 3A, a determination unit 23 is further provided in the power supply device 3 (FIG. 1) as illustrated in FIG. 14. The other configurations are the same. That is, in the catheter system 5A of Modified Example 3, the arrangement position of the determination unit 23 is changed in the catheter system 5 of the embodiment.

Also in Modified Example 3, the same effects can be basically obtained by the same operation as that of the embodiment.

In particular, in Modified Example 3, since the determination unit 23 is provided in the power supply device 3A, which is separate from the fluid supply device 2A, the configuration of the fluid supply device 2A can be simplified (the existing configuration can be used).

Modified Example 4

Figure 15:
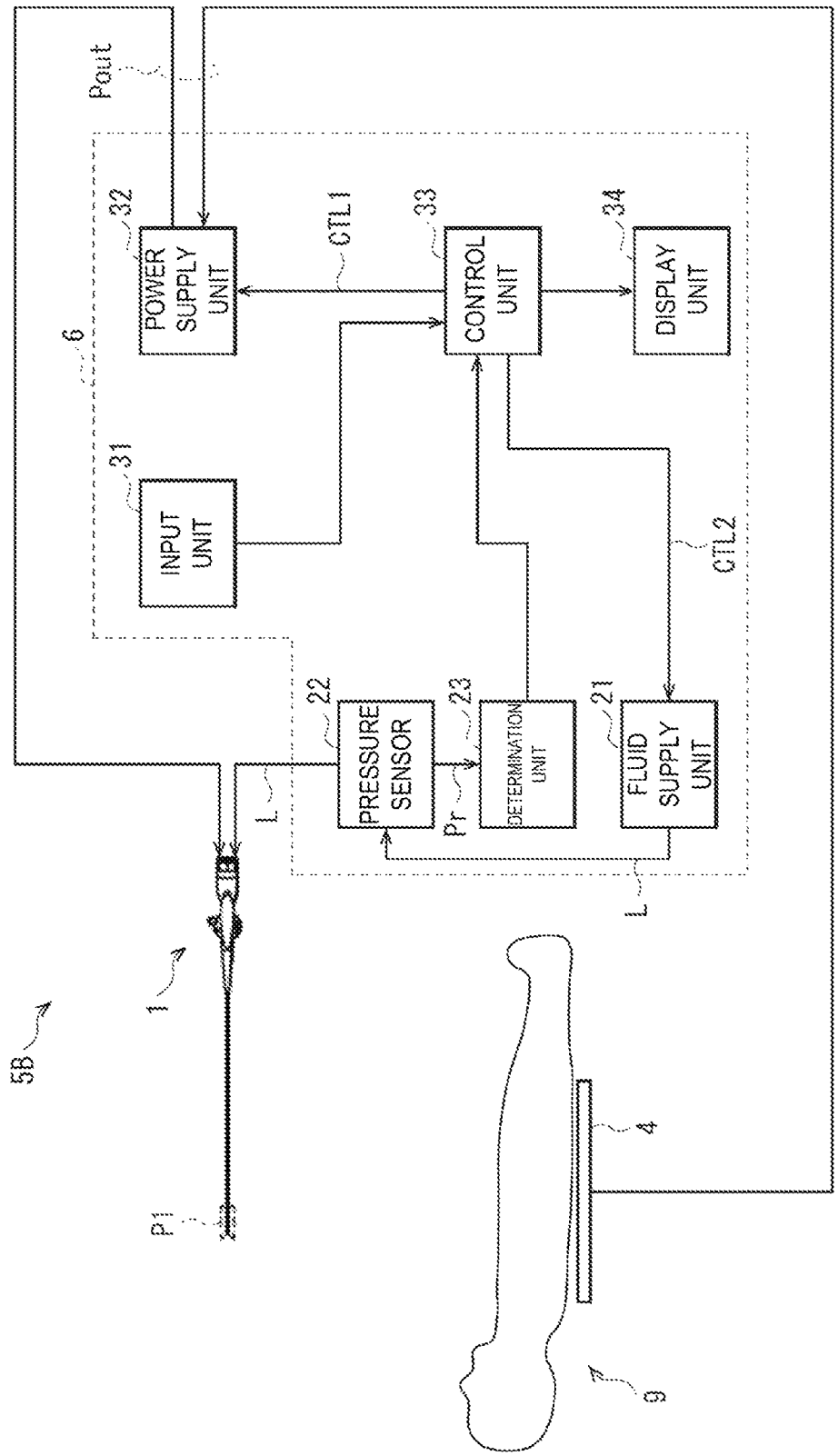
FIG. 15 is a block diagram schematically illustrating an overall configuration example of an electromedical device system including an electromedical device control system according to Modified Example 4.

FIG. 15 is a block diagram schematically illustrating an overall configuration example of a catheter system 5B as an electromedical device system according to Modified Example 4. As to the catheter system 5B, instead of the fluid supply device 2 and the power supply device 3 that are configured as separate devices, a control device 6 that is a single device is provided in the catheter system 5 (FIG. 1) of the embodiment. The other configurations are the same.

The control system (catheter control system) including the control device 6 corresponds to a specific example of the "electromedical device control system" in the present disclosure.

As illustrated in FIG. 15, the control device 6 includes the fluid supply unit 21, the pressure sensor 22 and the determination unit 23 provided in the fluid supply device 2, and the input unit 31, the power supply unit 32, the control unit 33, and the display unit 34 provided in the power supply device 3. That is, the fluid supply unit 21 and the determination unit 23 are provided in the control device 6, and the control device 6 corresponds to a specific example of the "single device" in the present disclosure.

Also in Modified Example 4, the same effects can be basically obtained by the same operation as that of the embodiment.

In particular, in Modified Example 4, since the control device 6, which is a single device, is provided instead of the fluid supply device 2 and the power supply device 3, the configuration of the entire catheter system 5B can be simplified.

3. OTHER MODIFIED EXAMPLES

Although the present disclosure has been described above with reference to the embodiment and several modified examples, the present disclosure is not limited to the embodiment and the like, and various modifications are possible.

For example, in the above-described embodiment and the like, the overall configuration of the catheter system and the catheter control system has been specifically described, but it is not always necessary to include all the devices, and other devices may be further included. Specifically, for example, at least one of the pressure sensor or the fluid supply unit may not be provided inside the catheter system (catheter control system), but may be provided outside the catheter system (catheter control system). Further, in the above-described embodiment and the like, the configuration of the ablation catheter (shaft) has been specifically described, but it is not always necessary to include all the members, and other members may be further included. Specifically, for example, a leaf spring that can be deformed in the curving direction may be provided as a swing member inside the shaft. The configuration of the electrodes of the shaft (arrangement, shapes, numbers, and the like of the ring-shaped electrodes and the distal end electrode) is not limited to that mentioned in the above-described embodiment.

In the above-described embodiment and the like, the ablation catheter of a type in which the shape near the distal end of the shaft changes in one direction according to the operation of the operating unit has been described as an example, but the present disclosure is not limited to this example. That is, for example, an ablation catheter of a type in which the shape near the distal end of the shaft changes in both directions according to the operation of the operating unit may be used, and in this case, a plurality of operating wires are used. Further, an ablation catheter of a type in which the shape near the distal end of the shaft is fixed may be used, and in this case, an operating wire, a rotating plate, and the like are not required.

The values, ranges, magnitude relations, and the like of various parameters described in the above-described embodiment and the like are not limited to those described in the above-described embodiment, and may be other values, ranges, magnitude relations, and the like.

In the above-described embodiment and the like, the ablation device (ablation catheter) has been described as a specific example of the electromedical device, but the present disclosure is not limited to this example, and other electromedical devices may be applied. The ablation device may be an ablation device that performs ablation using another electromagnetic wave such as a microwave or a high voltage pulse. The ablation using a high voltage pulse may be an ablation using an irreversible electroporation (IRE).

In the above-described embodiment and the like, an example of a monopolar type in which ablation is performed between the electrodes on the ablation catheter and the counter electrode plate (another electrode) has been described, but the present disclosure is not limited to this example. For example, a bipolar type in which ablation is performed between a plurality of electrodes on an ablation catheter may be used.

In the above-described embodiment and the like, the case where the fluid flowing through the flow path is an irrigation fluid (liquid) has been described as an example, but the present disclosure is not limited to this example, and other fluids may be used.

In the above-described embodiment and the like, an example of the correspondence relationship between the fluid flow rate (flow rate operation of the fluid) and the pressure threshold has been specifically described, but the present disclosure is not limited to the example given in the above-described embodiment and the like. For example, the type and the number of flow rate operations and pressure thresholds are not limited to the examples given in the above embodiments. The pressure threshold may be changed not continuously (seamlessly) but discontinuously (discretely or stepwise), for example.

In the above-described embodiment and the like, an example of a case (auto mode) where the setting of the fluid flow rate is controlled so as to be changeable by the control unit in the power supply device has been described, but the present disclosure is not limited to this example. For example, a case (a manual mode) may be employed where the fluid flow rate is set to be changeable according to a manual operation on the fluid supply device or the control device.

In the above-described embodiment and the like, the handling operation (predetermined handling operation) when it is determined that the fluid flow path is in a blocked state has been described with a specific example, but the present disclosure is not limited to the example given in the embodiment and the like, and other handling operations may be performed.

In the above-described embodiment and the like, the process of determining the blocked state of the flow path, the process of reducing the noise included in the pressure value, and the like have been specifically described. However, methods for the determination process and the noise reduction process are not limited to the methods described in the above-described embodiment and the like, and other methods may be used.

The series of processes described in the above-described embodiment and the like may be performed by hardware (circuit) or software (program). When the series of processes are done by software, the software includes a group of programs for causing a computer to execute each function. Each program may be used by being preliminarily incorporated in the computer, for example, or may be installed and used in the computer from a network or a recording medium.

The various examples described so far may be applied in any combination.

Note that the effects described in the present specification are mere examples and effects of the present disclosure are not limited thereto. Other effects may be also obtained.

The present disclosure may also have the following configuration.

(1)

An electromedical device control system including a determination unit that performs predetermined determination based on a pressure value of a fluid supplied to a flow path of an electromedical device, a pressure threshold set according to a setting value of a flow rate of the fluid, and an amount of change over time in the pressure value, wherein the flow rate of the fluid is set to be changeable, the pressure threshold increases as the setting value of the flow rate of the fluid increases, the pressure threshold decreases as the setting value of the flow rate of the fluid decreases, and the determination unit determines whether the amount of change over time in the pressure value is a positive value when determining that the pressure value is equal to or greater than the pressure threshold.

(2)

The electromedical device control system according to (1) described above, wherein the determination unit performs control such that a predetermined handling operation is executed when determining that the pressure value is equal to or greater than the pressure threshold and determining that the amount of change over time in the pressure value is a positive value.

(3)

The electromedical device control system according to (1) or (2) described above, wherein the determination unit determines whether a time in which the pressure value is equal to or greater than the pressure threshold is equal to or greater than a time threshold when determining that the pressure value is equal to or greater than the pressure threshold and determining that the amount of change over time in the pressure value is not a positive value.

(4)

The electromedical device control system according to (3) described above, wherein the determination unit performs control such that a predetermined handling operation is executed when determining that the time in which the pressure value is equal to or greater than the pressure threshold is equal to or greater than the time threshold, and the determination unit performs control such that the predetermined handling operation is not executed when determining that the time in which the pressure value is equal to or greater than the pressure threshold is less than the time threshold.

(5)

The electromedical device control system according to (2) described above, wherein the determination unit performs control such that the predetermined handling operation is not executed when determining that the pressure value is equal to or greater than the pressure threshold and determining that the amount of change over time in the pressure value is not a positive value.

(6) The electromedical device control system according to any one of (2), (4), and (5) described above, wherein the predetermined handling operation includes at least one of an operation of giving a warning to an outside, an operation of stopping supply of the fluid, or an operation of stopping supply of electric power to the electromedical device.

(7) The electromedical device control system according to any one of (2) to (6) described above, wherein the predetermined handling operation includes a handling operation when it is determined that at least a part of the flow path is in a blocked state.

(8) The electromedical device control system according to any one of (1) to (7) described above, wherein the determination unit performs determination using the pressure value and the amount of change over time in the pressure value after a predetermined reduction process is executed on noise included in the pressure value.

(9) The electromedical device control system according to any one of (1) to (8) described above, wherein the pressure threshold is set such that an amount of increase in the pressure threshold is zero or greater when the setting value of the flow rate of the fluid increases, and the pressure threshold is set such that an amount of decrease in the pressure threshold is zero or greater when the setting value of the flow rate of the fluid decreases.

(10) The electromedical device control system according to any one of (1) to (9) described above, further including a fluid supply unit that supplies the fluid to the flow path of the electromedical device, wherein the fluid supply unit and the determination unit are provided in a single device.

(11) The electromedical device control system according to any one of (1) to (9) described above, further including a fluid supply unit that supplies the fluid to the flow path of the electromedical device, wherein the fluid supply unit is provided in a fluid supply device, and the determination unit is provided in a power supply device separate from the fluid supply device.

(12) The electromedical device control system according to any one of (1) to (11) described above, wherein the electromedical device includes an irrigation mechanism that performs irrigation using the fluid.

(13) A method of controlling an electromedical device system, the method including performing predetermined determination based on a pressure value of a fluid supplied to a flow path of an electromedical device, a pressure threshold set according to a setting value of a flow rate of the fluid, and an amount of change over time in the pressure value, wherein the performing of the predetermined determination includes determining whether the amount of change over time in the pressure value is a positive value when determining that the pressure value is equal to or greater than the pressure threshold.

REFERENCE SIGNS LIST

1 Ablation catheter
11 Shaft
111a to 111c Ring-shaped electrode
112 Distal end electrode
12 Operating unit
121 Handle
122 Rotating plate
2, 2A Fluid supply device
21 Fluid supply unit
22 Pressure sensor
23 Determination unit
3, 3A Power supply device
31 Input unit
32 Power supply unit
33 Control unit
34 Display unit
4 Counter electrode plate
5, 5A, 5B Catheter system
6 Control device
9 Patient
Pout Power
L Fluid
Pr, Pr' Pressure value
Prth, Prth1, Prth2, Prth3 Pressure threshold
ΔPr Pressure gradient (amount of change over time in pressure value)
F Fluid flow rate
Fmax, Frf, Fst Flow rate
CTL1, CTL2 Control signal
t Time
t1 to t4 Timing
Δt Time
Δtth Time threshold
Nr Noise

The invention claimed is:

1. An electromedical device control system comprising:
a determination unit configured to perform predetermined determination based on a pressure value of a fluid supplied to a flow path of an electromedical device, a pressure threshold set according to a setting value of a flow rate of the fluid, and an amount of change over time in the pressure value, wherein
the determination unit determines whether the amount of change over time in the pressure value is a positive value when determining that the pressure value is equal to or greater than the pressure threshold, and
the determination unit determines whether a time in which the pressure value is equal to or greater than the pressure threshold is equal to or greater than a time threshold when determining that the pressure value is equal to or greater than the pressure threshold and determining that the amount of change over time in the pressure value is not a positive value.

2. The electromedical device control system according to claim 1, wherein
the determination unit performs control such that a predetermined handling operation is executed when determining that the pressure value is equal to or greater than the pressure threshold and determining that the amount of change over time in the pressure value is a positive value.

3. The electromedical device control system according to claim 1, wherein
the determination unit performs control such that a predetermined handling operation is executed when determining that the time in which the pressure value is equal to or greater than the pressure threshold is equal to or greater than the time threshold, and the determination unit performs control such that the predetermined handling operation is not executed when determining that the time in which the pressure value is equal to or greater than the pressure threshold is less than the time threshold.

4. The electromedical device control system according to claim 2, wherein
the determination unit performs control such that the predetermined handling operation is not executed when determining that the pressure value is equal to or greater than the pressure threshold and determining that the amount of change over time in the pressure value is not a positive value.

5. The electromedical device control system according to claim 2, wherein
the predetermined handling operation includes at least one of
an operation of giving a warning to an outside,
an operation of stopping supply of the fluid, or
an operation of stopping supply of electric power to the electromedical device.

6. The electromedical device control system according to claim 2, wherein
the predetermined handling operation includes a handling operation when it is determined that at least a part of the flow path is in a blocked state.

7. The electromedical device control system according to claim 1, wherein
the determination unit performs determination using the pressure value and the amount of change over time in the pressure value after a predetermined reduction process is executed on noise included in the pressure value.

8. The electromedical device control system according to claim 1, wherein
the pressure threshold is set such that an amount of increase in the pressure threshold is zero or greater when the setting value of the flow rate of the fluid increases, and
the pressure threshold is set such that an amount of decrease in the pressure threshold is zero or greater when the setting value of the flow rate of the fluid decreases.

9. The electromedical device control system according to claim 1, further comprising
a fluid supply unit configured to supply the fluid to the flow path of the electromedical device, wherein
the fluid supply unit and the determination unit are provided in a single device.

10. The electromedical device control system according to claim 1, further comprising
a fluid supply unit configured to supply the fluid to the flow path of the electromedical device, wherein
the fluid supply unit is provided in a fluid supply device, and
the determination unit is provided in a power supply device separate from the fluid supply device.

11. The electromedical device control system according to claim 1, wherein
the electromedical device includes an irrigation mechanism configured to perform irrigation using the fluid.

12. A method of controlling an electromedical device system, the method comprising:
performing predetermined determination based on a pressure value of a fluid supplied to a flow path of an electromedical device, a pressure threshold set according to a setting value of a flow rate of the fluid, and an amount of change over time in the pressure value, wherein
the performing of the predetermined determination includes determining whether the amount of change over time in the pressure value is a positive value when determining that the pressure value is equal to or greater than the pressure threshold, and
the performing of the predetermined determination includes determining whether a time in which the pressure value is equal to or greater than the pressure threshold is equal to or greater than a time threshold when determining that the pressure value is equal to or greater than the pressure threshold and determining that the amount of change over time in the pressure value is not a positive value.

* * * * *